(12) United States Patent
Nammi et al.

(10) Patent No.: US 10,404,339 B1
(45) Date of Patent: Sep. 3, 2019

(54) PRECODING MATRIX INDICATOR DETERMINATION IN WIRELESS COMMUNICATION SYSTEMS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/059,762

(22) Filed: Aug. 9, 2018

(51) Int. Cl.
*H04B 7/06* (2006.01)
*H04B 17/336* (2015.01)
*H04B 7/0456* (2017.01)

(52) U.S. Cl.
CPC ......... *H04B 7/0478* (2013.01); *H04B 7/0486* (2013.01); *H04B 7/063* (2013.01); *H04B 7/0626* (2013.01); *H04B 7/0639* (2013.01); *H04B 17/336* (2015.01)

(58) Field of Classification Search
CPC ... H04L 1/0026; H04L 1/0029; H04B 7/0632; H04B 7/0639; H04B 7/0626; H04B 7/0486; H04B 7/063; H04B 7/0478; H04B 17/336; H04W 24/10
See application file for complete search history.

(56) References Cited

U.S. PATENT DOCUMENTS

| 8,553,799 | B2 | 10/2013 | Wang et al. |
| 8,654,663 | B2 | 2/2014 | Prasad et al. |
| 8,675,764 | B2 | 3/2014 | Wang et al. |
| 8,817,904 | B2 | 8/2014 | Collotta et al. |
| 8,862,070 | B2 | 10/2014 | Kim et al. |
| 9,350,432 | B2 | 5/2016 | Wang et al. |
| 9,614,599 | B2 | 4/2017 | Lei et al. |
| 9,634,748 | B2 | 4/2017 | Wang et al. |
| 9,705,577 | B2 | 7/2017 | Zhang et al. |

(Continued)

FOREIGN PATENT DOCUMENTS

| EP | 2562951 A1 | 2/2013 |
| JP | 2009225130 A | 10/2009 |
| JP | 2013526136 A | 6/2013 |

OTHER PUBLICATIONS

Cui, et al., "Adaption Feedback of Precoding Matrix Indicator for 3GPP LTE/LTE-A System," ©2012 IEEE, 4 pages.

(Continued)

*Primary Examiner* — Khanh C Tran
(74) *Attorney, Agent, or Firm* — Amin, Turocy & Watson, LLP

(57) ABSTRACT

The described technology is generally directed towards reducing the complexity for finding the precoding matrix index/rank information channel state information in New Radio wireless systems. Described is using the beam characteristics of X1 (wideband component index) and X2 (subband component index) such that a user equipment first determines a best chosen X2 for only one X1 index. Thereafter, the user equipment uses the chosen index of X2 for the other X1 indices, thereby reducing the complexity of the precoding matrix index/rank information search by reducing the search space in the codebook, which reduces the number of computations at the user equipment side without significantly impacting the performance.

20 Claims, 16 Drawing Sheets

(56) References Cited

U.S. PATENT DOCUMENTS

| | | |
|---|---|---|
| 9,847,817 B2 | 12/2017 | Wang et al. |
| 9,859,962 B2 | 1/2018 | Wang et al. |
| 9,859,964 B2 | 1/2018 | Pham et al. |
| 9,967,008 B2 | 5/2018 | Wang et al. |
| 9,985,700 B2 | 5/2018 | Hwang et al. |
| 2009/0046800 A1 | 2/2009 | Xu et al. |
| 2009/0116570 A1 | 5/2009 | Bala et al. |
| 2009/0163142 A1* | 6/2009 | Pi ............... H04L 1/0026 455/62 |
| 2011/0032839 A1 | 2/2011 | Chen et al. |
| 2011/0110455 A1 | 5/2011 | Gaal et al. |
| 2011/0122794 A1* | 5/2011 | Kim ............... H04L 1/0026 370/252 |
| 2011/0249578 A1* | 10/2011 | Nayeb Nazar ........ H04L 1/0027 370/252 |
| 2012/0230274 A1 | 9/2012 | Xiao et al. |
| 2013/0028341 A1 | 1/2013 | Ayach et al. |
| 2013/0083753 A1* | 4/2013 | Lee ............... H04W 72/0453 370/329 |
| 2013/0324050 A1* | 12/2013 | Gutierrez ............ H04W 24/10 455/67.11 |
| 2014/0317241 A1* | 10/2014 | Zhao ............... H04L 65/608 709/219 |
| 2014/0369436 A1 | 12/2014 | Zhang et al. |
| 2016/0149630 A1 | 5/2016 | Liu |
| 2018/0006699 A1* | 1/2018 | Enescu ............. H04B 7/0632 |

OTHER PUBLICATIONS

Dai, et al., "A PMI Feedback Scheme for Downlink Multi-user MIMO Based on Dual-Codebook of LTE-Advanced," © 2012 IEEE, 5 pages.

Fu, et al., "Research on the Selection Algorithm of Precoding Matrix in TDD LTE," © 2011 IEEE, 4 pages.

Ogawa, et al., "A Low Complexity PMI/RI Selection Scheme in LTE-A systems," ©2013 IEEE, 5 pages.

Schwarz, et al., "Mutual Information based Calculation of the Precoding Matrix Indicator for 3GPP UMTS/LTE," 2010 International ITG Workshop on Smart Antennas (WSA 2010), 7 pages.

* cited by examiner

PRECODING MATRIX INDICATOR DETERMINATION IN WIRELESS COMMUNICATION SYSTEMS

TECHNICAL FIELD

The subject application is related to wireless communication systems, and, for example, to determining the precoding matrix indicator (PMI) in multiple antenna wireless communication systems.

BACKGROUND

In wireless communication systems, multiple input multiple output (MIMO), is an antenna technique configured to improve the spectral efficiency and thereby boost overall system capacity. The MIMO technique uses a commonly known notation (M×N) to represent MIMO configuration in terms number of transmit (M) and receive antennas (N) on one end of the transmission system. MIMO systems can significantly increase the data carrying capacity of wireless systems. MIMO can be used for achieving diversity gain, spatial multiplexing gain and beamforming gain.

In new radio (NR), sometimes referred to as 5G, a user equipment computes channel estimates based on known pilots or reference signals from the 5G system, computes the parameters needed for channel state information (CSI) reporting and conveys this information to the network through the feedback channel. More particularly, the user equipment receiver estimates channel quality (typically signal-to-interference-plus-noise ratio, or SINR) from channel sounding, and computes a preferred precoding matrix indicator (PMI), rank indicator (RI), and Channel Quality Indicator (CQI) for the next downlink transmission.

For downlink data transmission, the demodulation reference signals (DM-RS) and the data are multiplied by the precoding matrix selected by the network device (e.g., gNode B) and transmitted. The user equipment receiver estimates the effective channel (the channel multiplied by the precoding matrix) and demodulates the data.

Codebook based precoding allows the receiver to explicitly identify the precoding matrix/vector that is to be used for transmission, based on a codebook. As an example, in the 3GPP NR standard, separate codebooks are defined for various combinations of the number of transmit antennas and the number of transmission layers; (the number of transmission layers is also referred to as rank information (RI)).

Finding the PMI/RI with larger numbers of antennas is a highly complex problem, involving many computations, and is based on an exhaustive search over codebook elements; the codebook size grows as the number of antennas increases. For example with four CSI-RS ports, the user equipment needs to search eighty precoding entities to find the rank information and precoding index. This can drain the user equipment battery life, increase power consumption, and/or consume significant memory and processing units at the user equipment.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
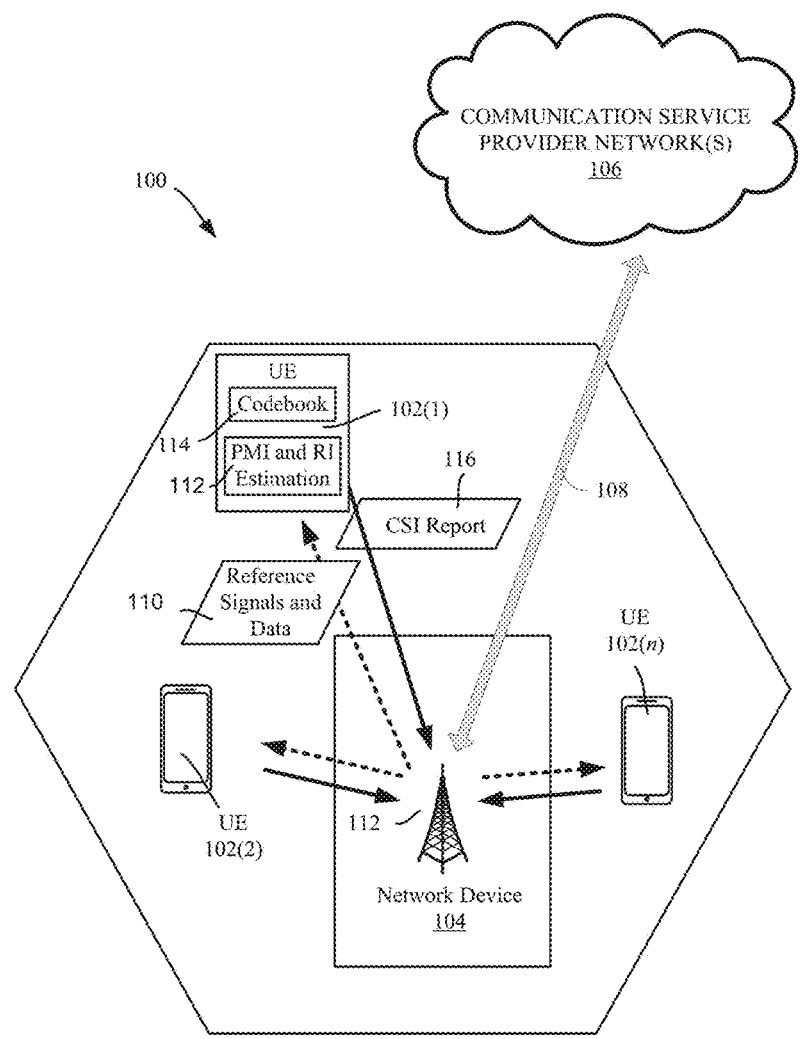
FIG. 1 illustrates an example wireless communication system in which a network node device (e.g., network node) and user equipment (UE) can implement various aspects and implementations of the subject disclosure.

Briefly, one or more aspects of the technology described herein are generally directed towards reducing the complexity in determining the CSI (e.g., including the rank information and precoding index) for both periodic and aperiodic reporting. In one or more implementations, the beam characteristics of the wideband and subband component indices (X1 and X2) are used by a user equipment process that selects only one X1, and for that X1, chooses the X2 that provides the "best" link quality metric (corresponding to capacity or mutual information). The user equipment process then uses the chosen index of X2 for the other X1 indices to find the "best" [X1, chosen X2] combination, and need not use any other X2 indices. This significantly reduces the complexity of the RI/PMI search, because the search space in the codebook is reduced, thereby reducing the number of computations at the user equipment. Evaluations demonstrate that the user equipment process significantly reduces the complexity but does not significantly impact the performance.

Thus, one or more aspects of the technology described herein comprise having the user equipment (MIMO receiver) estimate the channel from known pilots or reference signals (and/or data), and compute the post-processing SINR for one value of X1, e.g., X1=1, and for the values of X2 that correspond to that X1. The user equipment computes a first group of hypotheses comprising the link quality metric (mutual information or capacity) from the computed SINR for the [X1=1, X2] combinations, and chooses the X2 of these hypotheses that maximizes the mutual information or capacity.

Once the X2 is chosen, the user equipment computes the link quality metric for the other X1 values in conjunction with the chosen X2 value, to obtain a second group of hypotheses, comprising [X1, chosen X2] combinations. The user equipment selects the PMI based on the second group of hypotheses, that is, the combination that maximizes the mutual information or capacity. The user equipment reports the computed PMI parameters to the network device.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

FIG. 1 illustrates an example wireless communication system 100 in accordance with various aspects and embodiments of the subject technology. In one or more embodiments, the system 100 can comprise one or more user equipment UEs 102(1)-102(n).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE) 102, thus providing connectivity between the UE and the wider cellular network.

In example implementations, each UE 102 such as the UE 102(1) is able to send and/or receive communication data via a wireless link to the network device 104. The dashed arrow lines from the network device 104 to the UE 102 represent downlink (DL) communications and the solid arrow lines from the UE 102 to the network devices 104 represents uplink (UL) communications.

The system 100 can further include one or more communication service provider networks 106 that facilitate providing wireless communication services to various user equipment, including UEs 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled). Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is, data plus speech is simultaneously scheduled).

FIG. 1 illustrates an example wireless communication system 100 in accordance with various aspects and embodiments of the subject technology. In one or more embodiments, the system 100 can comprise one or more user equipment UEs 102(1)-102(n).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE) 102, thus providing connectivity between the UE and the wider cellular network.

In example implementations, each UE 102 such as the UE 102(1) is able to send and/or receive communication data via a wireless link to the network device 104. The dashed arrow lines from the network device 104 to the UE 102 represent downlink (DL) communications and the solid arrow lines from the UE 102 to the network devices 104 represents uplink (UL) communications.

The system 100 can further include one or more communication service provider networks 106 that facilitate providing wireless communication services to various user equipment, including UEs 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to receive references signals and data 110, and use those to estimate the PMI (and RI) via a PMI and RI estimation process 112. A codebook 114 may be searched for the (note that as used herein, PMI can be defined as an index within the 114, or the PMI can be defined as a precoder itself, depending on the context). Once the PMI and RI are estimated, these data are returned as part of a CSI report 116 to the network device 104. Described herein is how the user equipment estimates a suitable CSI, e.g., CQI/PMI/RI, in order to attempt to maximize the throughput and simultaneously maintain the block-error-rate (BLER) constraint.

The following table, TABLE 1, represents an example CSI report:

| PMI-FormatIndicator = widebandPMI and CQI-FormatIndicator = widebandCQI | PMI-FormatIndicator = subbandPMI or CQI-FormatIndicator = subbandCQI | | |
|---|---|---|---|
| | | CSI Part II | |
| | CSI Part I | wideband | Sideband |
| CRI | CRI | Wideband CQI for the second TB | Subband differential CQI for the second TB of all even subbands |
| Rank Indicator | Rank Indicator | PMI wideband (X1 and X2) | PMI subband information fields X₂ of all even subbands |
| Layer Indicator | Layer Indicator | — | Subband differential CQI for the second TB of all odd subbands |
| PMI wideband (X1 and X2) | Wideband CQI | — | PMI subband information fields X₂ of all odd subbands |
| PMI-FormatIndicator = widebandPMI and CQI-FormatIndicator = widebandCQI | PMI-FormatIndicator = subbandPMI or CQI-FormatIndicator = subbandCQI | | |
| | | CSI Part II | |
| | CSI Part I | wideband | Sideband |
| Wideband CQI | Subband differential CQI for the first TB | — | — |

As described herein, in NR, the user equipment needs to estimate a suitable CSI, including, CQI/PMI/RI, in order to maximize the throughput while simultaneously maintaining the block-error-rate (BLER) constraint, which can be mathematically described by a joint (integer) optimization problem, $$\max_{CQI,PMI,RI} \text{Throughput}(CQI, PMI, RI) \tag{1}$$

$$\text{subject to} \quad BLER \leq \text{Threshold}$$

This joint (discrete/integer) optimization problem does not have any closed-form solution. Hence, one technique tries to estimate a suitable PMI/RI (independent of CQI); thereafter, a suitable CQI is estimated accordingly for the chosen PMI (and RI).

By way of example, consider a single-cell scenario having perfect time and synchronization, a received system model for (closed-loop) SM per sub-carrier (post-FFT) can be shown as, $$Y = HWX + N \tag{2}$$

where, $Y \in X^{N_r \times 1}$ corresponds to a received signal vector, and $H \in X^{N_r \times N_t}$ describes an overall channel matrix. A complex zero-mean Gaussian noise vector $n \in C^{N_r \times 1}$ has covariance $R_n$. An unknown complex data/symbol vector is denoted by $x \in A^{N_L \times 1}$ (having normalized power $E\{xx^H\} = R_x = I$) corresponding to M-QAM (e.g., 64-QAM) constellation A. A (complex) precoder $W_{PMI} \in \Pi^{N_t \times N_L}$ is selected from a given/known codebook $\Pi$ having $N_\Pi$ number of precoders (where, PMI={0, 1, ... $N_\Pi$-1}) for a given rank≤min{$N_r$, $N_t$}.

The post-processing SINR per $i^{th}$ spatial layer for a given PMI, assuming linear-MMSE detector employed at the receiver, reads $$SINR_i = \frac{1}{[W_{PMI}^H H^H R_n^{-1} H W_{PMI} + I_{N_L}]_{i,i}} - 1, \tag{3}$$

where $[A]_{i,i}$ corresponds to an $i^{th}$ diagonal element of a matrix A.

In order to estimate a suitable PMI/RI, a link-quality metric (LQM), e.g., mean mutual information, denoted as mMI (per sub-band/wide-band) is computed, as given below, $$mMI(PMI, RI) = \left(\frac{1}{K \cdot \text{rank}}\right) \sum_{k=1}^{K} \sum_{i=1}^{RI=\text{rank}} I(SINR_i[k]) \tag{4}$$

where, $I(SINR_i[k])$ is a mutual information that is a function of post-processing $SINR_i[k]$ (and modulation alphabet A) as given in Table 6 for $i^{th}$ spatial layer and $k^{th}$ resource-element. The number of resource-elements employed for the computation of the aforementioned LQM is given by a parameter K (depending on the wide-band/sub-band PMI estimate).

TABLE 2

Mutual information for 4-QAM, 16-QAM and 64-QAM.

| Modulation Alphabet A | Mutual Information per symbol |
|---|---|
| 4-QAM | $I(SINR_i) \approx J(\sqrt{4SINR_i})$ |
| 16-QAM | $I(SINR_i) \approx (\frac{1}{2})J(0.8818\sqrt{SINR_i}) + (\frac{1}{4})J(1.6764\sqrt{SINR_i}) + (\frac{1}{4})J(0.9316\sqrt{SINR_i})$ |
| 64-QAM | $I(SINR_i) \approx (\frac{1}{3})J(1.1233\sqrt{SINR_i}) + (\frac{1}{3})J(0.4381\sqrt{SINR_i}) + (\frac{1}{3})J(0.4765\sqrt{SINR_i})$ |

$$J(a) \approx \begin{cases} -0.04210610\ a^3 + 0.209252\ a^2 \\ \quad -0.00640081\ a, & 0 < a < 1.6363 \\ 1 - \exp(0.00181491\ a^3 - 0.142675\ a^2 \\ \quad -0.08220540\ a + 0.0549608), & 1.6363 < a < \infty \end{cases}$$

After having the estimate of mMI (per sub-band/wide-band), the PMI and RI can be jointly estimated, employing unconstrained optimization, which can be given as $$\max_{PMI, RI} mMI(PMI, RI).$$

Note that conventionally, an exhaustive search of the PMI and RI are computed based on the mutual information approach. Note that the CQI is computed afterwards with the chosen PMI/RI.

Instead of finding mutual information, in an alternative approach, the capacity is calculated as shown below in equation (4):

$$capacity(PMI, RI) = \left(\frac{1}{K \cdot rank}\right) \sum_{k=1}^{K} \sum_{i=1}^{RI=rank} \log_2(1 + SINR_i[k]) \quad (4)$$

Figure 2:
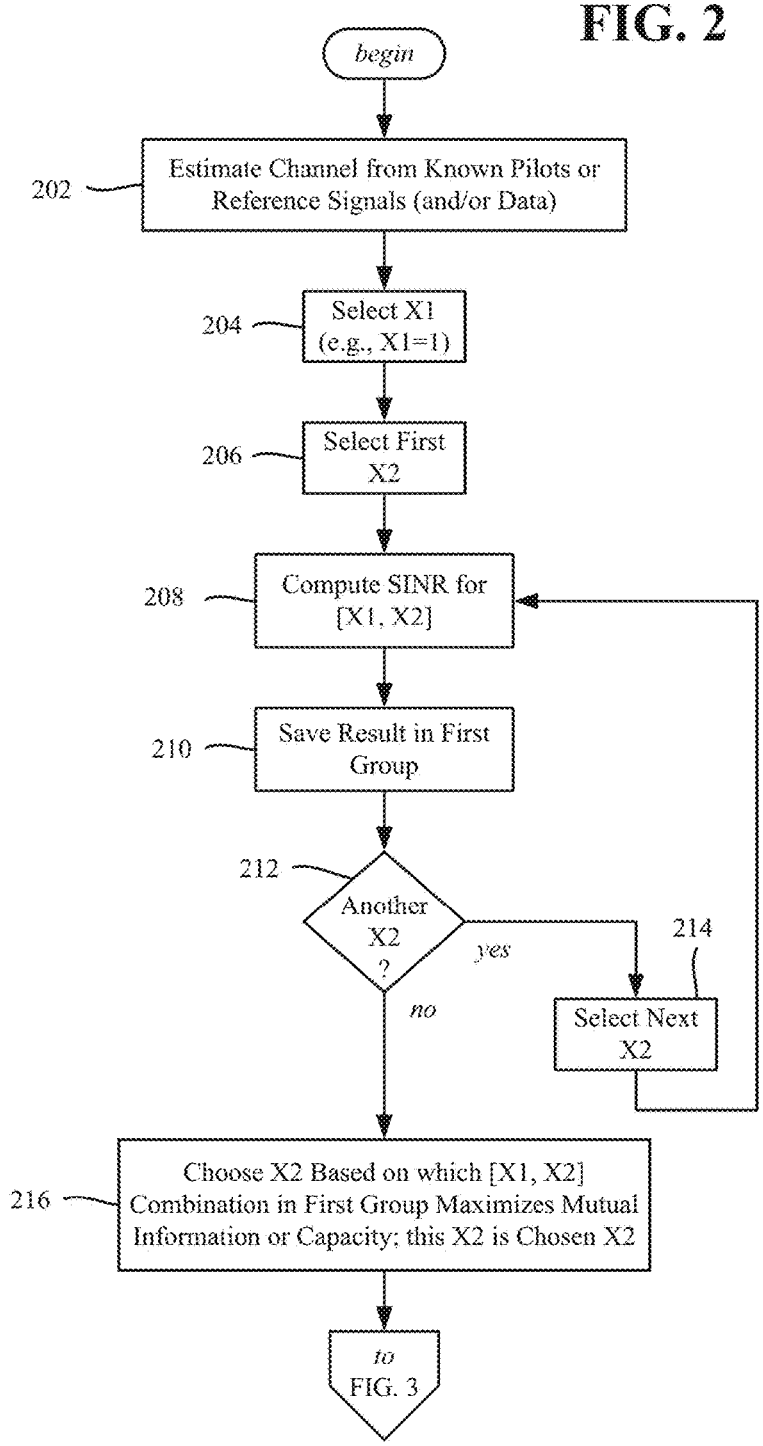
FIGS. 2 and 3 is a flow diagram representing example operations for determining a precoding matrix indicator without performing a full search, in accordance with various aspects and implementations of the subject disclosure.
Figure 3:
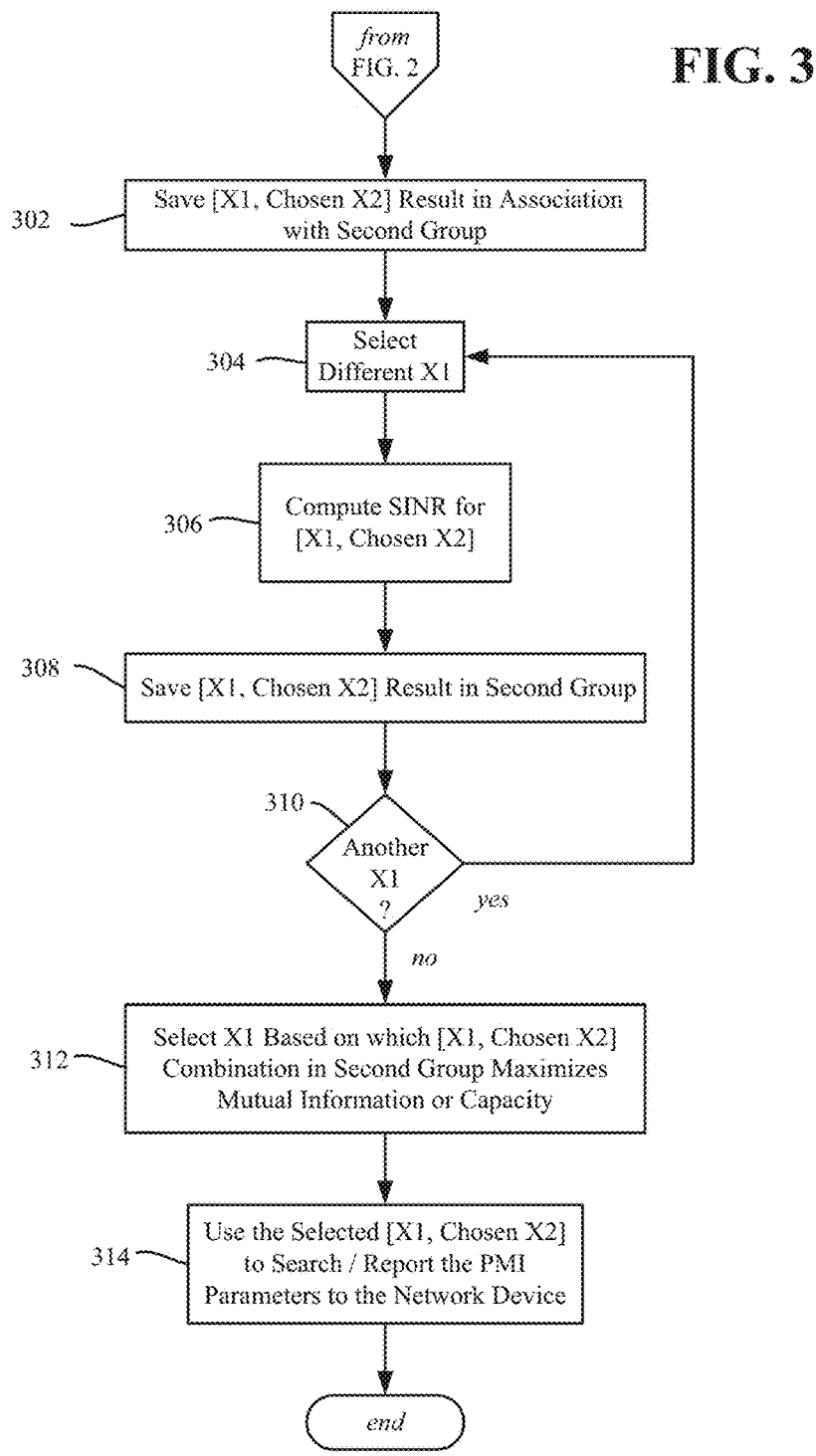

In contrast to the conventional, exhaustive search, FIGS. 2 and 3 show example logic of the PMI and RI estimation process 112 (FIG. 1) described herein, in the form of operations. Operation 202 represents estimating a channel from known pilots or reference signals (and/or data), e.g., received by the user equipment from the network device 104 as represented by block 110 of FIG. 1.

Operation 204 represents selecting an X1 (wideband component) index, e.g., X1=1 (although any of the available X1 indices can be selected, such as randomly. Operation 206 represents selecting an X2 (subband component) index value that corresponds to the selected X1 index value; X2 can be selected in any order/using any technique, e.g., from a first to last index value, as long as each X2 gets selected.

Operation 208 computes the SINR for the [selected X1, currently selected X2] combination, which is saved in a first group of results. Operations 212 and 214 repeat the computations/result savings for each other X2, using the selected X1.

Once the first group of results is obtained, operation 216 chooses a chosen X2 index value based on which [X1, X2] combination in the first group maximizes the mutual information or capacity; this X2 is referred to herein as the chosen X2.

Once the chosen X2 is known, the operations continue at operation 302 of FIG. 3, to find the X1 index value that works "best" with the chosen X2 value. Operation 302 saves the already computed result for the mutual information or capacity for the [selected X1, chosen X2] in association with a second group. Operation 304 selects a different X1, and operation 306 computes the SINR with the [different X1, chosen X2] values. This result is saved in the second group.

Operation 310 repeats the process by returning to operation 304 for different X1 index values, using the chosen X2, until none remain.

At this time, as represented by operation 312, one of the [X1, chosen X2] combinations maximizes the mutual information or capacity relative to the others, e.g., determined as described herein. This combination is selected and used for the PMI estimation; as can be seen from TABLE 3, the codebook search is significantly reduced relative to the full search:

TABLE 3

Comparison of conventional versus technology described herein:

| | Number of combinations for X1 and X2 | | Total number of combinations (existing full search) | Total number of combinations for the technology described herein | % of savings in the search |
|---|---|---|---|---|---|
| Rank | X1 | X2 | | | |
| 1 | 8 | 4 | 32 | 4 + 7 = 11 | 65.63 |
| 2 | 8 | 2 | 16 | 2 + 7 = 9 | 43.75 |
| 3 | 8 | 2 | 16 | 2 + 7 = 9 | 43.75 |
| 4 | 8 | 2 | 16 | 2 + 7 = 9 | 43.75 |

Figure 4:
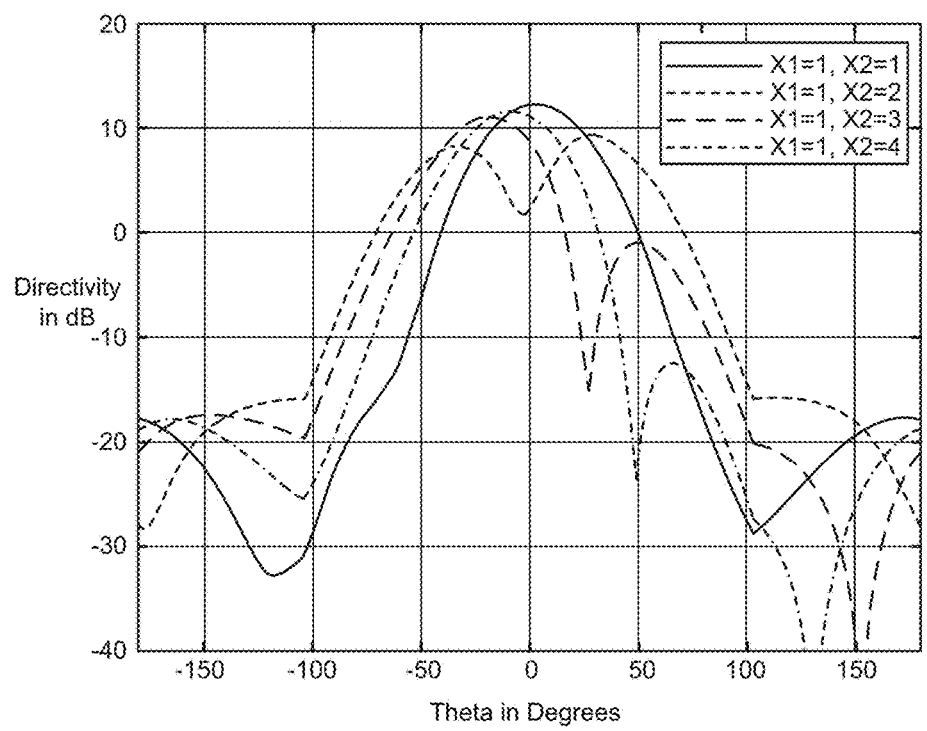
FIGS. 4-6 are graphical representations of horizontal radiation patterns different wideband-based component (X1) and suband-based component (X2) index values, in accordance with various aspects and implementations of the subject disclosure.
Figure 5:
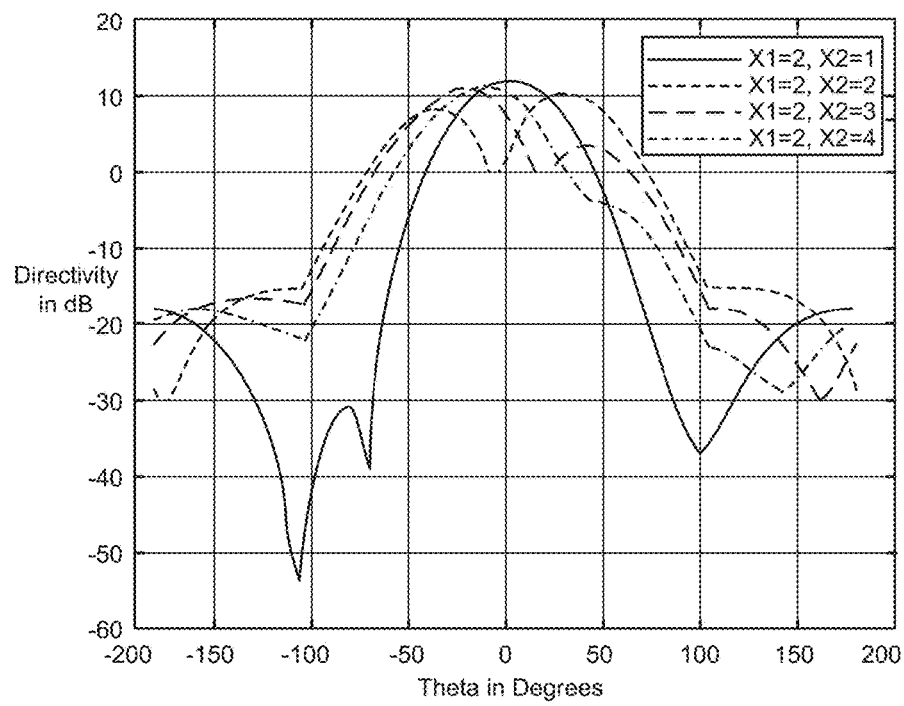
Figure 6:
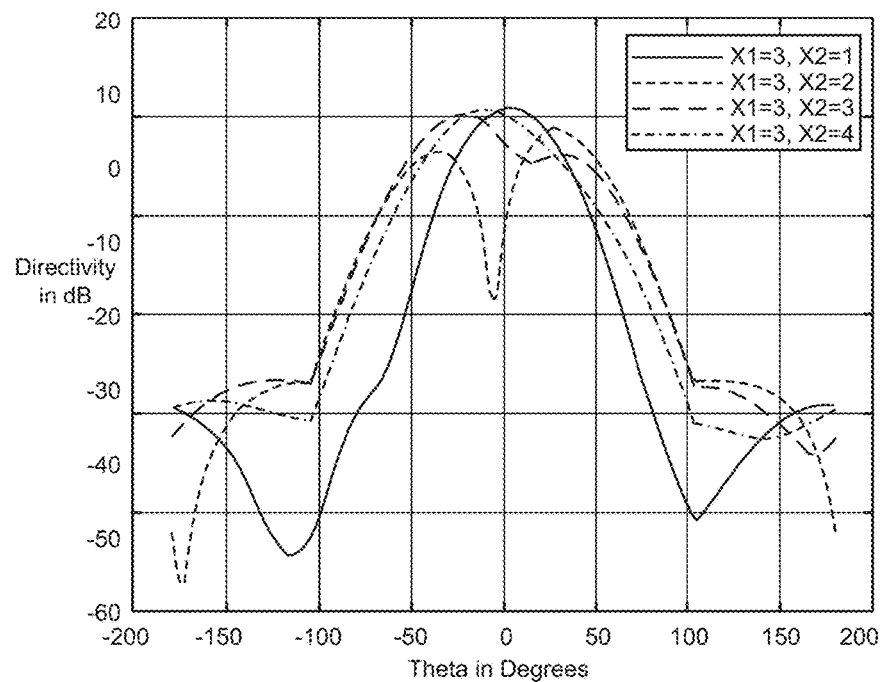

As can be seen, is that for a given index X1=i, with the maximum capacity obtained for index say X2=j, then for any index X1, the maximum capacity is obtained for X2=j for that PMI. As an example, FIGS. 4, 5 and 6 show the radiation patterns for rank equal to one, with X1=1, X1=2, and X1=3, respectively, for X2=1, 2, 3, 4. Note that rectangular antennas were used for plotting these radiation patterns.

It can be seen from FIGS. 4-6 that the radiation pattern in general depends on X2, and is generally the same irrespective of X1. That is, the phase angle theta of X1–X2 is generally the same for any X1. Thus, as described herein, by finding the "best" X2 index for one X1, then the same X2 index can be used for the remaining X1.

Figure 7:
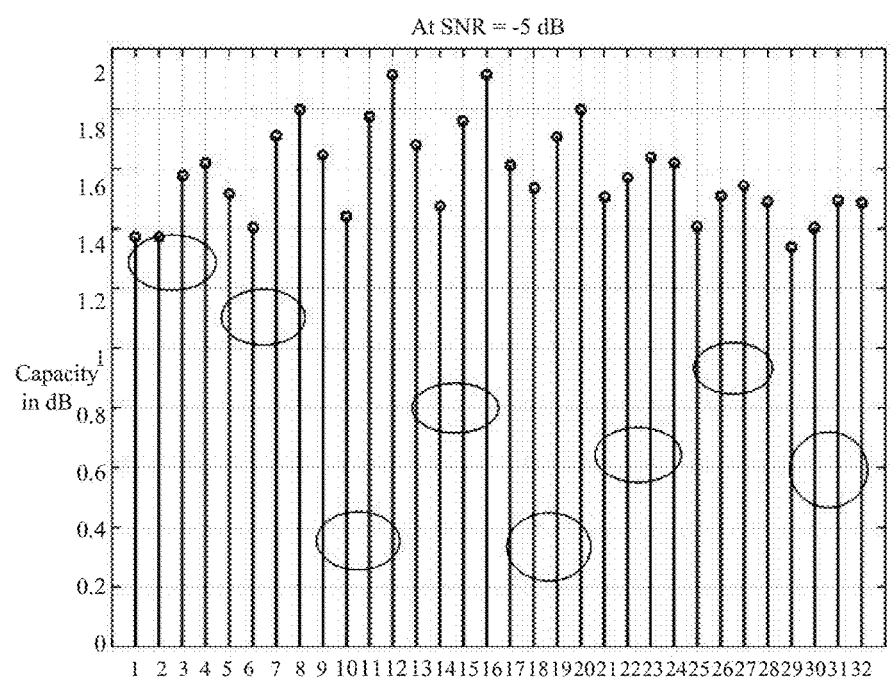
FIGS. 7-9 are graphical representations of rank 1 precoding matrix indicators at different signal-to-noise ratio values, in accordance with various aspects and implementations of the subject disclosure.
Figure 8:
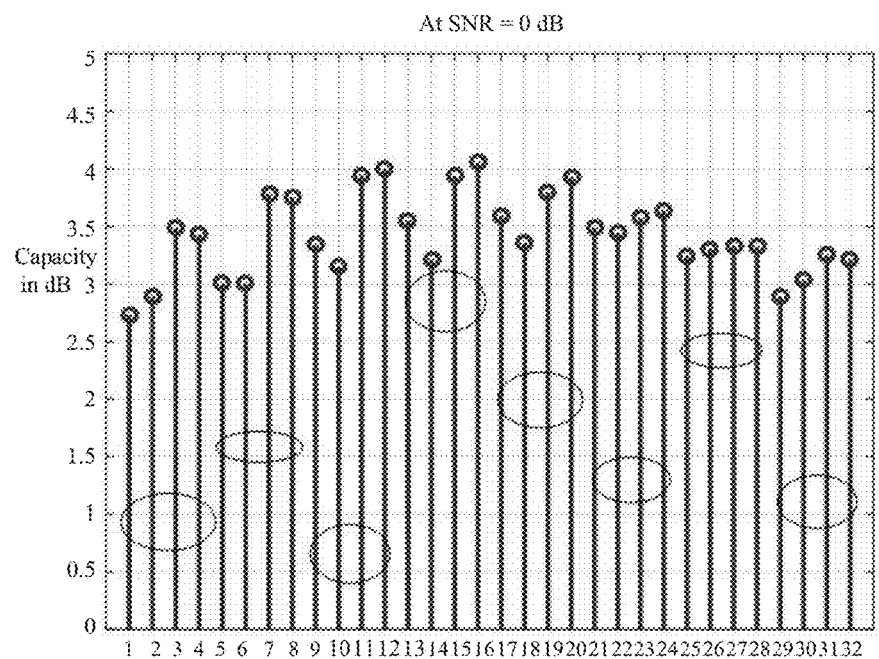
Figure 9:
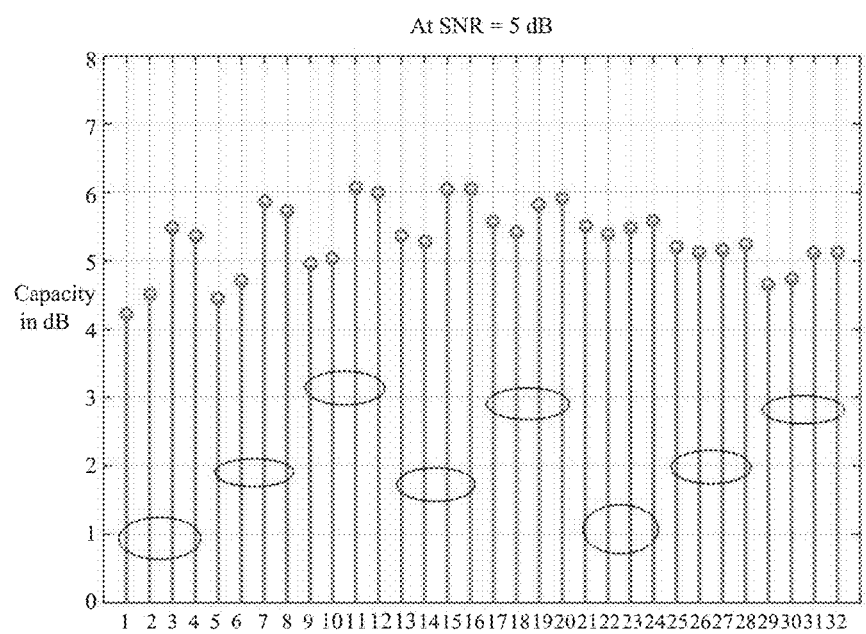

To verify this principle, FIGS. 7-9 verify the capacity estimation during the CSI computation for the full set of PMIs. As shown in FIG. 7, in which the capacity at SNR is equal to −5 dB, it can be observed that for any given group (a group is indicated by a black oval) the fourth index typically provides the maximum capacity (and is very close for the exceptions). The same trend is observed for different SNRs as shown in FIG. 8 (SNR=5 dB) and FIG. 9 (SNR=5 dB). Thus, by finding the index of X2 that maximizes the capacity for a given X1, then the search space for the other X1 can be reduced.

Thus, in one or more implementations, the user equipment/receiver computes the PMI using a complete search for only one index of X1, that is, computes the capacity for only one X1 and each of the values of X2. Then the user equipment/receiver computes the index of X2 that gives the best capacity. Once the chosen value of index X2 is thus obtained, same X2 index is used for the other X1s in computing the link quality metric. In this way, the receiver node eliminates computing the link quality metrics of for all the other X2 indices for the remaining indices for X1.

Figure 10:
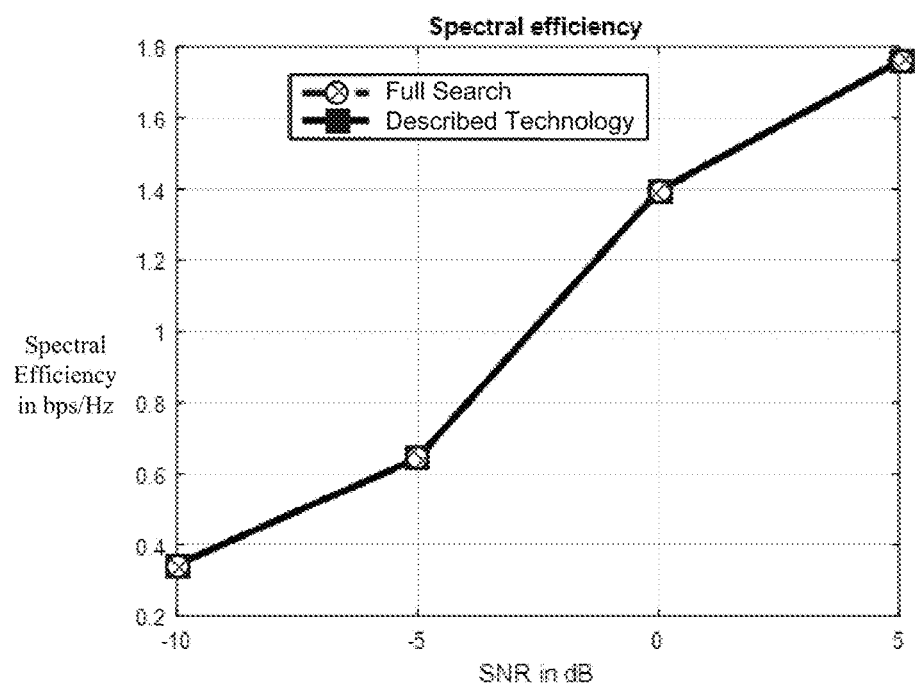
FIG. 10 is a graphical representation of spectral efficiency versus signal-to-noise ratios with full search for PMI reporting versus reduced search based on the technology described herein, in accordance with various aspects and implementations of the subject disclosure.

FIG. 10 shows link simulation results performed with full search for PMI reporting and with the technology described herein. Note that to show the benefits, the spectral efficiency is plotted with rank=1. It can be observed that the performance of the technology described herein is equal to that of the performance of the full search.

Figure 11:
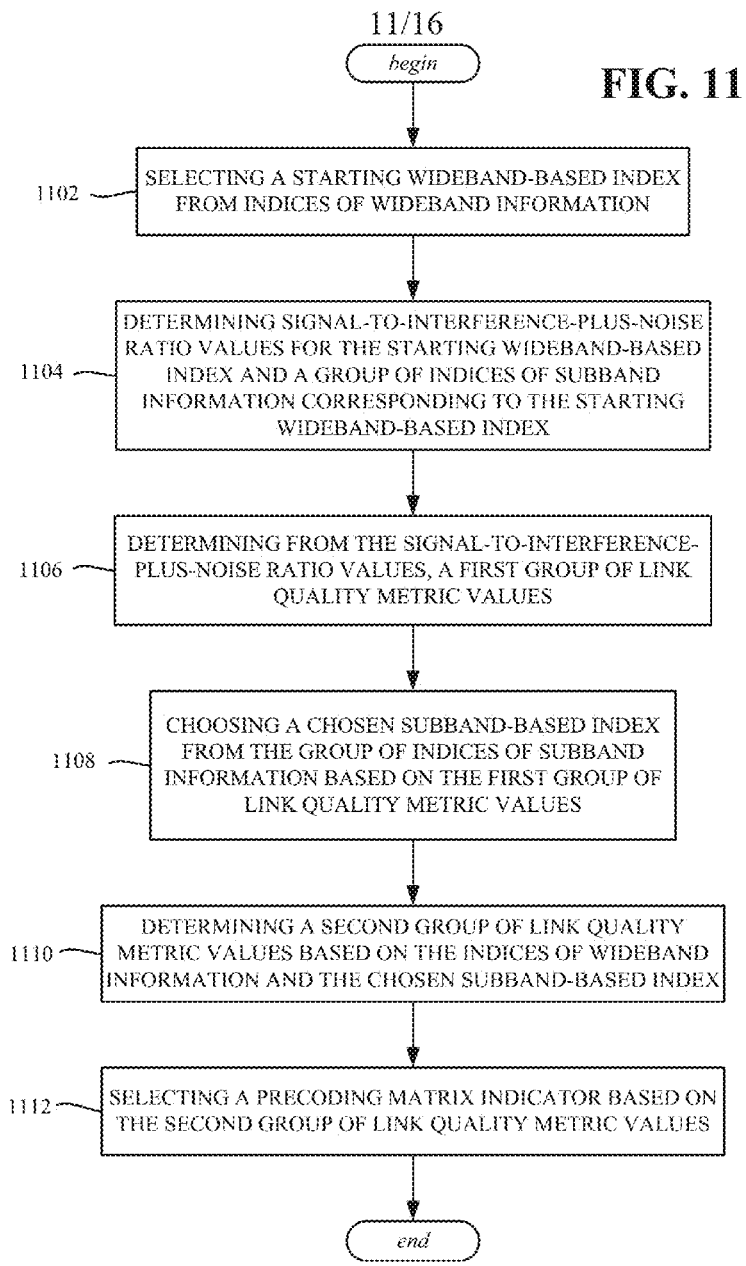
FIG. 11 illustrates a flow diagram of example user equipment operations for determining a precoding matrix indicator without performing a full search, in accordance with various aspects and implementations of the subject disclosure.

One or more aspects, generally represented in FIG. 11, are generally directed towards selecting, by a user equipment comprising a processor, a starting wideband-based index (X1) from indices of wideband information (operation 1102). Operation 1104 represents determining, by the user equipment, signal-to-interference-plus-noise ratio values for the starting wideband-based index and a group of indices of subband information (X2) corresponding to the starting wideband-based index. Operation 1106 represents determining, by the user equipment from the signal-to-interference-plus-noise ratio values, a first group of link quality metric values, and operation 1108 represents choosing, by the user equipment, a chosen subband-based index from the group of indices of subband information based on the first group of link quality metric values. Operation 1110 represents determining, by the user equipment, a second group of link quality metric values based on the indices of wideband information and the chosen subband-based index, and operation 1112 represents selecting, by the user equipment, a precoding matrix indicator based on the second group of link quality metric values, by a network device comprising a processor.

Selecting the precoding matrix indicator can comprise searching a codebook based on a selected wideband index and the chosen subband-based index. Aspects can comprise estimating, by the user equipment, a channel, wherein the obtaining the signal-to-interference-plus-noise ratio values can comprise determining the signal-to-interference-plus-noise ratio values based on the channel. Aspects can comprise reporting, by the user equipment, parameter values corresponding to the precoding matrix indicator to a network device.

Determining the first group of link quality metric values based on the signal-to-interference-plus-noise ratio values can comprise determining mutual information values for the starting wideband-based index and the group of indices of subband information corresponding to the initial wideband-based index based on the signal-to-interference-plus-noise ratio values. Choosing the chosen subband-based index from the group of indices of subband information based on the first group of link quality metric values can comprise selecting the subband-based index, which in conjunction with the starting wideband-based index, maximizes mutual information values based on the signal-to-interference-plus-noise ratio values.

Determining the first group of link quality metric values based on the signal-to-interference-plus-noise ratio values can comprise determining capacity data for the starting wideband-based index and the group of indices of subband information corresponding to the starting wideband-based index based on the signal-to-interference-plus-noise ratio values. Choosing the chosen subband-based index from the group of indices of subband information based on the first group of link quality metric values can comprise selecting as the chosen subband-based index, the subband-based index that in conjunction with the subband-based index wideband-based index, maximizes capacity data.

Determining the second group of link quality metric values based on the signal-to-interference-plus-noise ratio values can comprise determining mutual information values for the indices of wideband information and the chosen subband-based index of subband information based on the signal-to-interference-plus-noise ratio values. Selecting the precoding matrix indicator based on the second group of link quality metric values can comprise selecting the precoding matrix indicator based on which index of wideband information of the indices of wideband information, in conjunction with the chosen subband-based index, maximizes the mutual information values.

Determining the second group of link quality metric values based on the signal-to-interference-plus-noise ratio values can comprise determining capacity data for the indices of wideband information and the chosen subband-based index of subband information based on the signal-to-interference-plus-noise ratio values. Selecting the precoding matrix indicator based on the second group of link quality metric values can comprise selecting the precoding matrix indicator based on which index of wideband information of the indices of wideband information, in conjunction with the chosen subband-based index, maximizes the capacity data.

Figure 12:
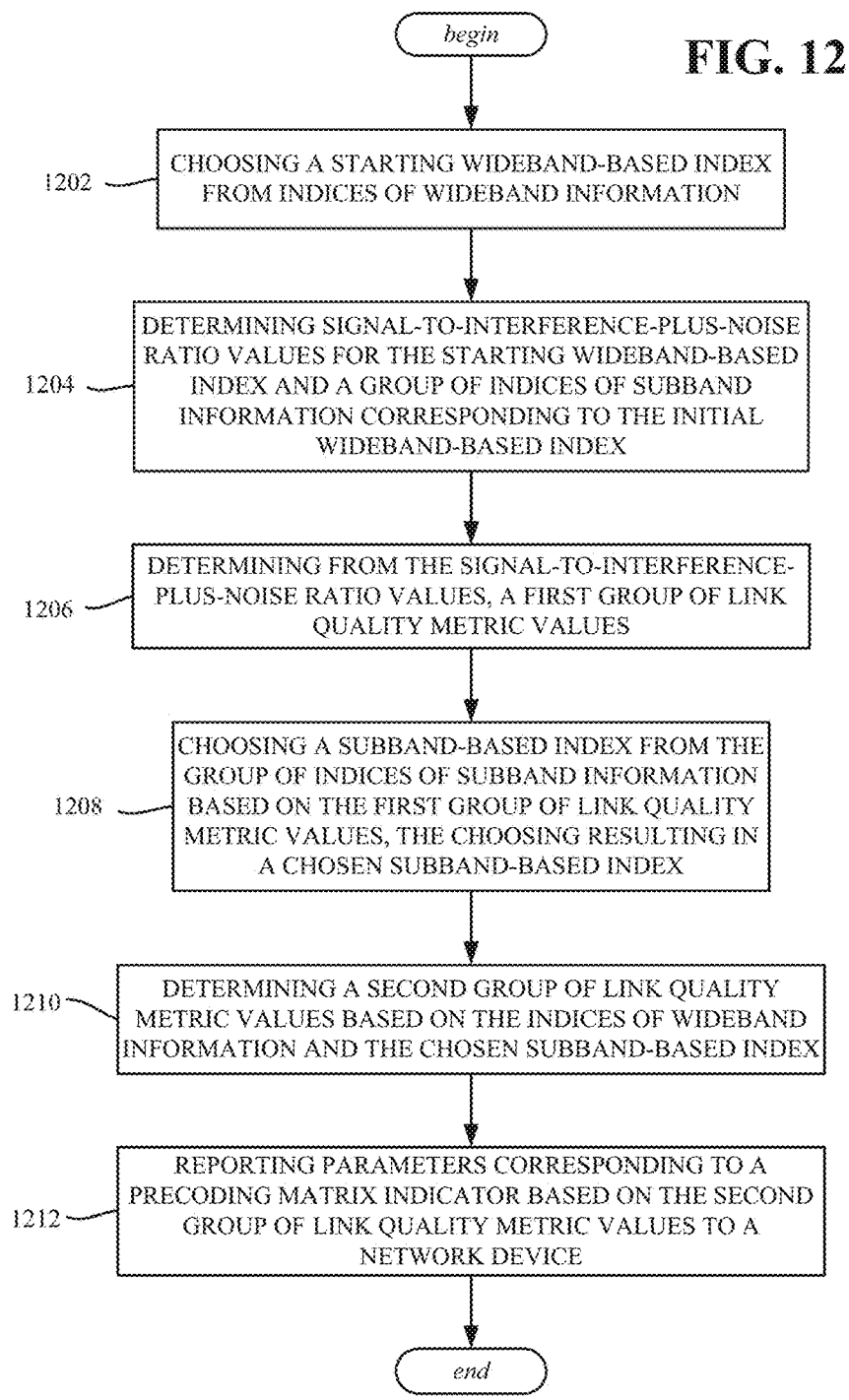
FIG. 12 illustrates a flow diagram of example user equipment operations, comprising operations for determining and reporting a precoding matrix indicator without performing a full search, in accordance with various aspects and implementations of the subject disclosure.

FIG. 12 represents example operations of a user equipment device, comprising choosing a starting wideband-based index from indices of wideband information (operation 1202). Operation 1204 represents determining signal-to-interference-plus-noise ratio values for the starting wideband-based index and a group of indices of subband information corresponding to the initial wideband-based index. Operation 1206 represents determining, from the signal-to-interference-plus-noise ratio values, a first group of link quality metric values. Operation 1208 represents choosing a subband-based index from the group of indices of subband information based on the first group of link quality metric values, the choosing resulting in a chosen subband-based index. Operation 1210 represents determining a second group of link quality metric values based on the indices of wideband information and the chosen subband-based index. Operation 1212 represents reporting parameters corresponding to a precoding matrix indicator based on the second group of link quality metric values to a network device.

The first group of link quality metric values can comprise first mutual information values, and the second group of link quality metric values can comprise second mutual information values. The first group of link quality metric values can comprise first capacity data and the second group of link quality metric values can comprise second capacity data.

The first group of link quality metric values can comprise first mutual information values, the second group of link quality metric values can comprise second mutual information values, and choosing the chosen subband-based index from the group of indices of subband information based on the first group of link quality metric values can comprise determining which index of the group of indices of subband information maximizes the first mutual information values; reporting the parameters corresponding to the precoding matrix indicator based on the second group of link quality metric values to a network device can comprise choosing the precoding matrix indicator by determining which index of the indices of wideband information, in conjunction with the chosen subband-based index, maximizes the first mutual information values.

The first group of link quality metric values can comprise first capacity data, the second group of link quality metric values can comprise second capacity data, the choosing the chosen subband-based index from the group of indices of subband information based on the first group of link quality metric values can comprise determining which index of the group of indices of subband information maximizes the first capacity data, and reporting the parameters corresponding to the precoding matrix indicator based on the second group of link quality metric values can comprise choosing the precoding matrix indicator by determining which index of the indices of wideband information, in conjunction with the chosen subband-based index, maximizes the first capacity data.

Figure 13:
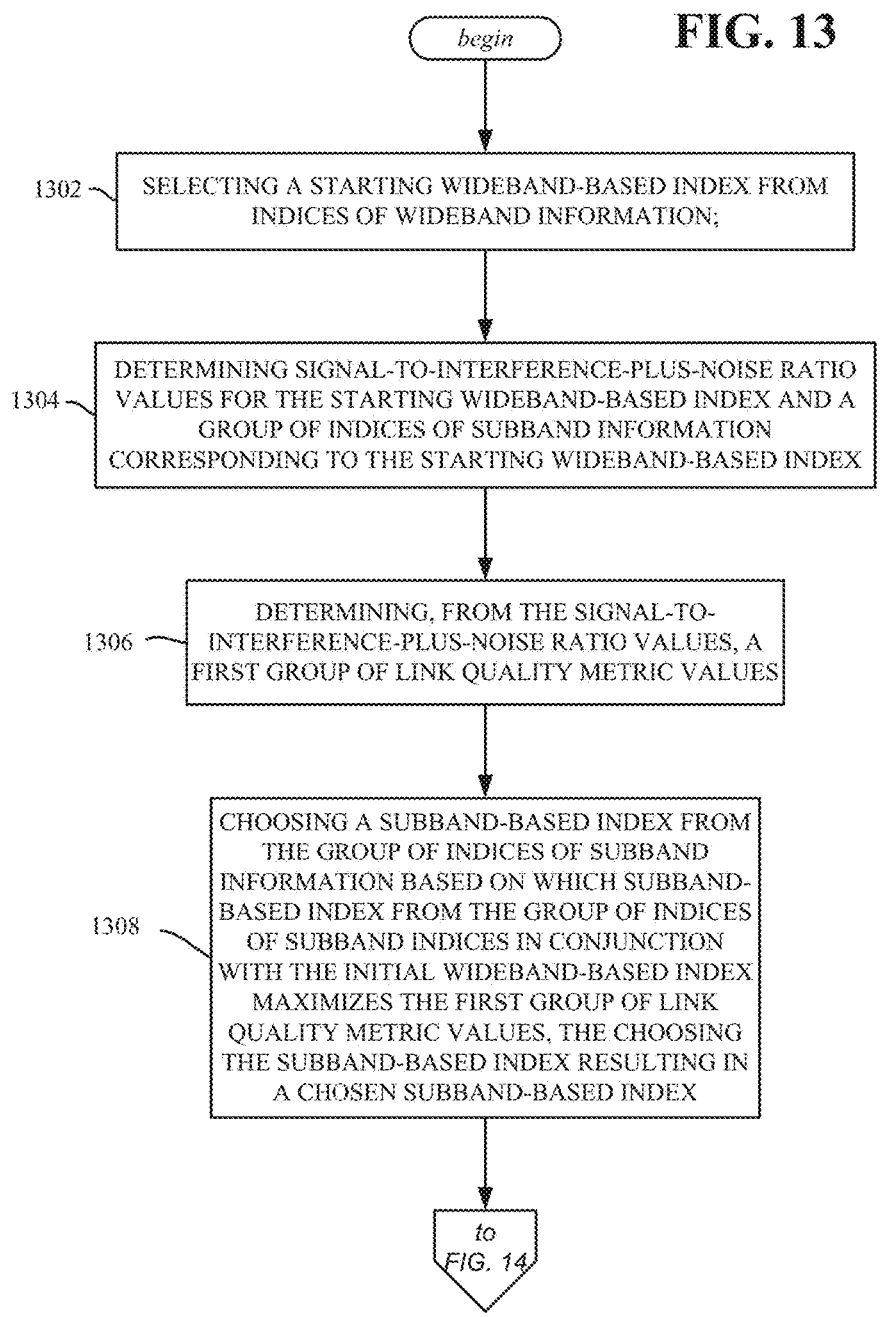
FIGS. 13 and 14 illustrate a flow diagram of example user equipment operations for determining a precoding matrix indicator without performing a full search, in accordance with various aspects and implementations of the subject disclosure.
Figure 14:
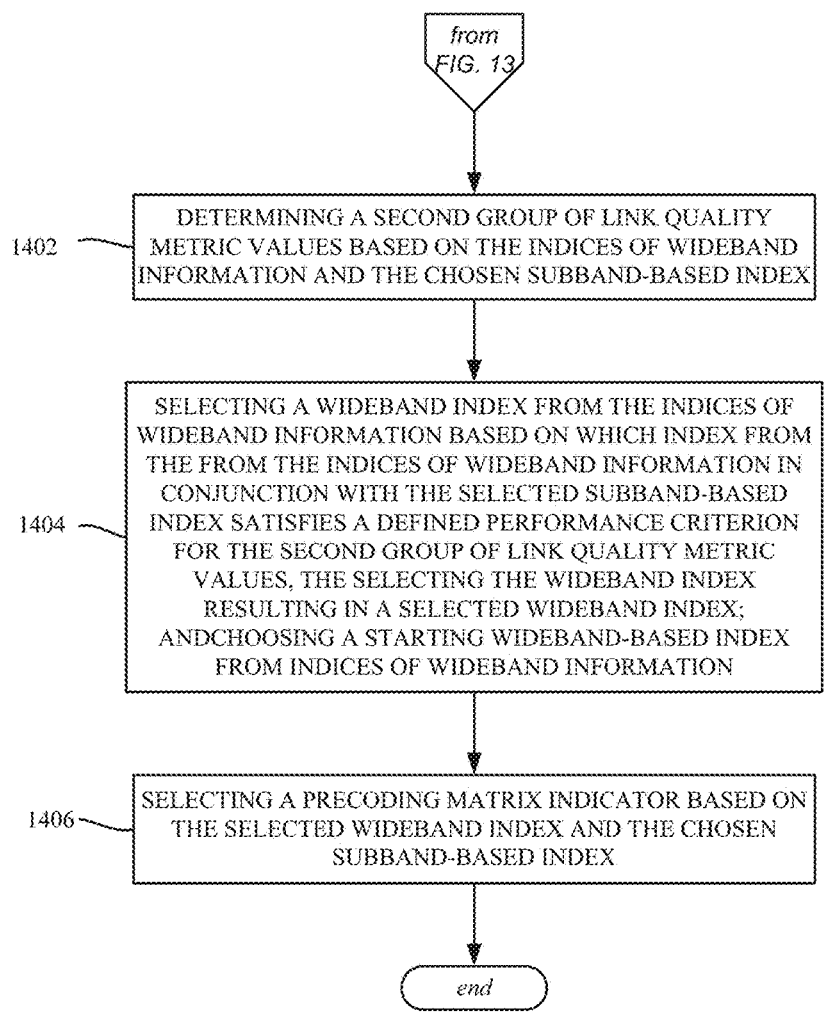

FIGS. 13 and 14 represent operations, such as in the form of a machine-readable storage medium, comprising executable instructions that, when executed by a processor of a user equipment, facilitate performance of operations. Operation 1302 represents selecting a starting wideband-based index from indices of wideband information. Operation 1304 represents determining signal-to-interference-plus-noise ratio values for the starting wideband-based index and a group of indices of subband information corresponding to the starting wideband-based index. Operation 1306 represents determining, from the signal-to-interference-plus-noise ratio values, a first group of link quality metric values. Operation 1308 represents choosing a subband-based index from the group of indices of subband information based on which subband-based index from the group of indices of subband indices in conjunction with the initial wideband-based index maximizes the first group of link quality metric values, the choosing the subband-based index resulting in a chosen subband-based index.

The example continues with operation 1402 of FIG. 14, which represents determining a second group of link quality metric values based on the indices of wideband information and the chosen subband-based index. Operation 1404 represents selecting a wideband index from the indices of wideband information based on which index from the from the indices of wideband information in conjunction with the selected subband-based index satisfies a defined performance criterion for the second group of link quality metric values, the selecting the wideband index resulting in a selected wideband index. Operation 1406 represents selecting a precoding matrix indicator based on the selected wideband index and the chosen subband-based index The first group of link quality metric values can comprise mutual information values, and choosing the chosen subband-based index can comprise determining which subband-based index from the group of indices of subband indices in conjunction with the starting wideband-based index maximizes the mutual information values. The first group of link quality metric values can comprise capacity data, and the choosing the chosen subband-based index can comprise determining which subband-based index from the group of indices of subband indices in conjunction with the starting wideband-based index maximizes the capacity data.

Figure 15:
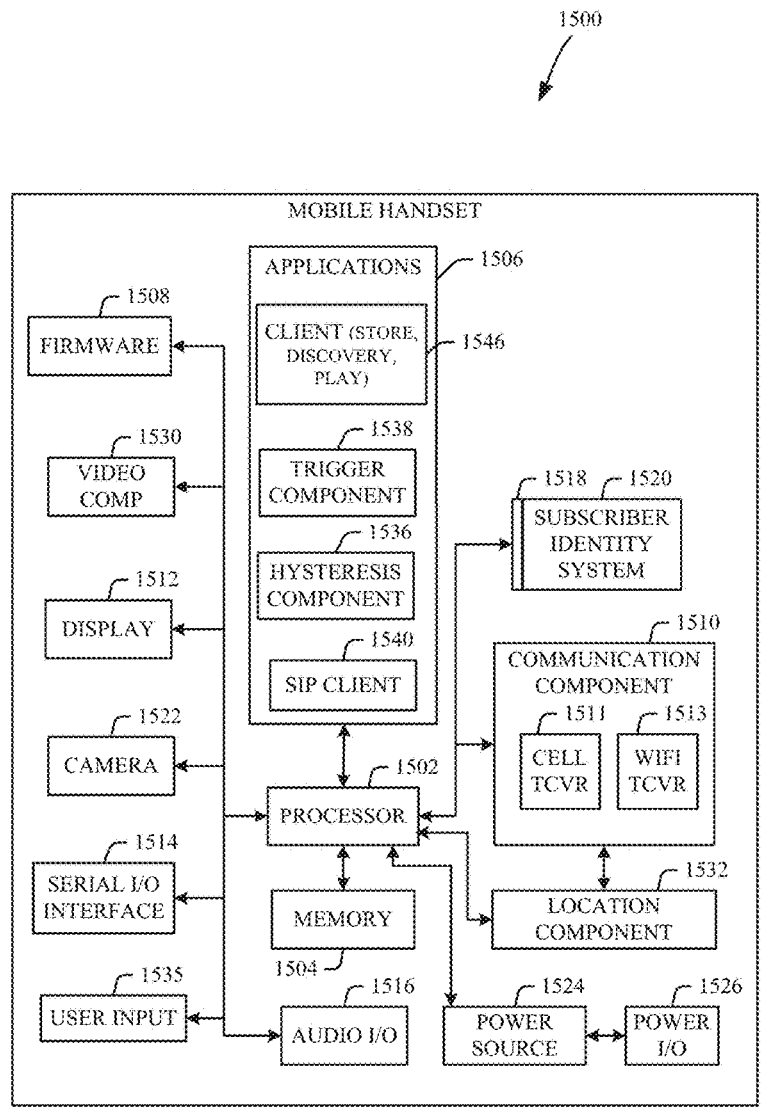
FIG. 15 illustrates an example block diagram of an example mobile handset operable to engage in a system architecture that facilitates wireless communications according to one or more embodiments described herein.

Referring now to FIG. 15, illustrated is an example block diagram of an example mobile handset 1500 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks The handset 1500 includes a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1594) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communications component 1510 to accommodate IP traffic from an IP network such as, for example, the Internet, a corporate intranet, a home network, a person area network, etc., through an ISP or broadband cable provider. Thus, VoIP traffic can be utilized by the handset 1500 and IP-based multimedia content can be received in either an encoded or a decoded format.

A video processing component 1522 (e.g., a camera) can be provided for decoding encoded multimedia content. The video processing component 1522 can aid in facilitating the generation, editing, and sharing of video quotes. The handset 1500 also includes a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1536 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 1510, includes an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
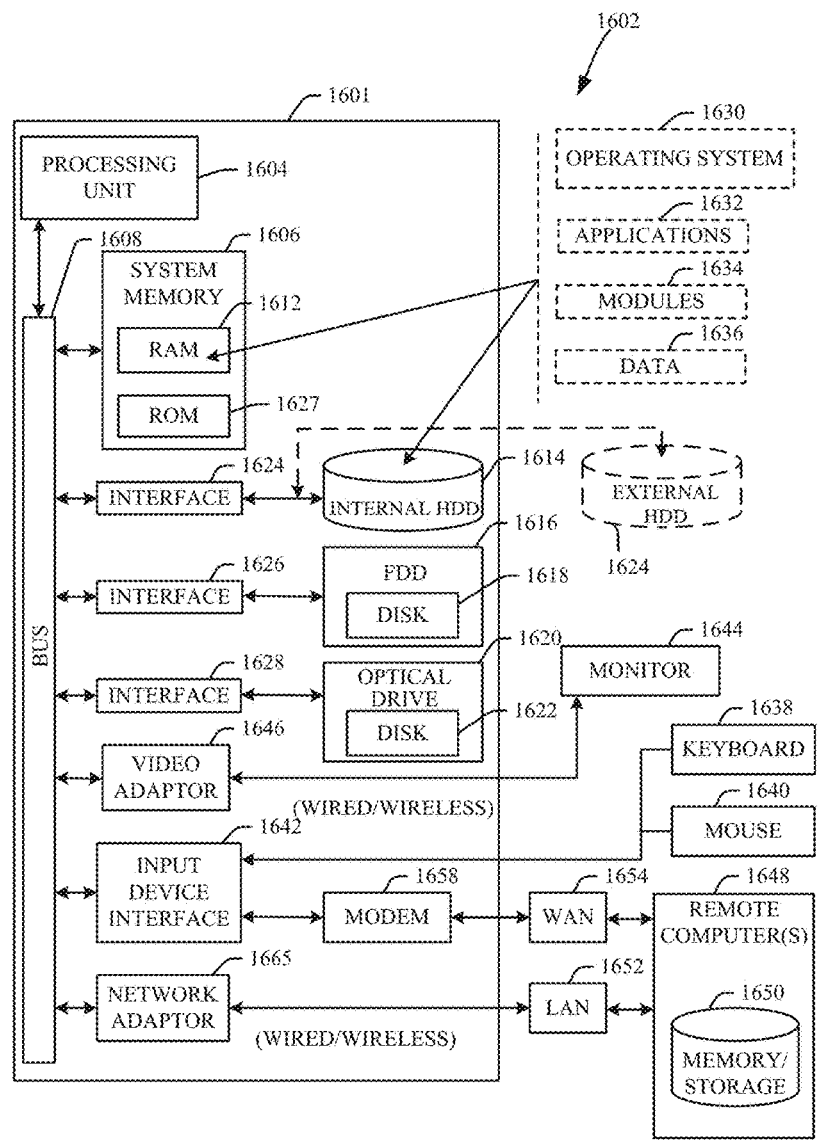
FIG. 16 illustrates an example block diagram of an example computer operable to engage in a system architecture that facilitates wireless communications according to one or more embodiments described herein.

Referring now to FIG. 16, illustrated is an example block diagram of an example computer 1600 operable to engage in a system architecture that facilitates wireless communications according to one or more embodiments described herein. The computer 1600 can provide networking and communication capabilities between a wired or wireless communication network and a server (e.g., Microsoft server) and/or communication device. In order to provide additional context for various aspects thereof, FIG. 16 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 16 is but one example of a computing device.

In order to provide a context for the various aspects of the disclosed subject matter, FIG. 16 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1620 (see below), non-volatile memory 1622 (see below), disk storage 1624 (see below), and memory storage 1646 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 16 illustrates a block diagram of a computing system 1600 operable to execute the disclosed systems and methods in accordance with an embodiment. Computer 1612, which can be, for example, part of the hardware of system 1620, includes a processing unit 1614, a system memory 1616, and a system bus 1618. System bus 1618 couples system components including, but not limited to, system memory 1616 to processing unit 1614. Processing unit 1614 can be any of various available processors. Dual microprocessors and other multiprocessor architectures also can be employed as processing unit 1614.

System bus 1618 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1694), and Small Computer Systems Interface (SCSI).

System memory 1616 can include volatile memory 1620 and nonvolatile memory 1622. A basic input/output system (BIOS), containing routines to transfer information between elements within computer 1612, such as during start-up, can be stored in nonvolatile memory 1622. By way of illustration, and not limitation, nonvolatile memory 1622 can include ROM, PROM, EPROM, EEPROM, or flash memory. Volatile memory 1620 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1612 can also include removable/non-removable, volatile/non-volatile computer storage media. FIG. 16 illustrates, for example, disk storage 1624. Disk storage 1624 includes, but is not limited to, devices like a magnetic disk drive, floppy disk drive, tape drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to system bus 1618, a removable or non-removable interface is typically used, such as interface 1626.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 16 describes software that acts as an intermediary between users and computer resources described in suitable operating environment 1600. Such software includes an operating system 1628. Operating system 1628, which can be stored on disk storage 1624, acts to control and allocate resources of computer system 1612. System applications 1630 take advantage of the management of resources by operating system 1628 through program modules 1632 and program data 1634 stored either in system memory 1616 or on disk storage 1624. It is to be noted that the disclosed subject matter can be implemented with various operating systems or combinations of operating systems.

A user can enter commands or information into computer 1612 through input device(s) 1636. As an example, a mobile device and/or portable device can include a user interface embodied in a touch sensitive display panel allowing a user to interact with computer 1612. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1614 through system bus 1618 by way of interface port(s) 1638. Interface port(s) 1638 include, for example, a serial port, a parallel port, a game port, a universal serial bus (USB), an infrared port, a Bluetooth port, an IP port, or a logical port associated with a wireless service, etc. Output device(s) 1640 and a move use some of the same type of ports as input device(s) 1636.

Thus, for example, a USB port can be used to provide input to computer 1612 and to output information from computer 1612 to an output device 1640. Output adapter 1642 is provided to illustrate that there are some output devices 1640 like monitors, speakers, and printers, among other output devices 1640, which use special adapters. Output adapters 1642 include, by way of illustration and not limitation, video and sound cards that provide means of connection between output device 1640 and system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. Remote computer(s) 1644 can be a personal computer, a server, a router, a network PC, cloud storage, cloud service, a workstation, a microprocessor based appliance, a peer device, or other common network node and the like, and typically includes many or all of the elements described relative to computer 1612.

For purposes of brevity, only a memory storage device 1646 is illustrated with remote computer(s) 1644. Remote computer(s) 1644 is logically connected to computer 1612 through a network interface 1648 and then physically connected by way of communication connection 1650. Network interface 1648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1650 refer(s) to hardware/software employed to connect network interface 1648 to bus 1618. While communication connection 1650 is shown for illustrative clarity inside computer 1612, it can also be external to computer 1612. The hardware/software for connection to network interface 1648 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gate-ways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   selecting, by a user equipment comprising a processor, a starting wideband-based index from indices of wideband information;
   determining, by the user equipment, signal-to-interference-plus-noise ratio values for the starting wideband-based index and a group of indices of subband information corresponding to the starting wideband-based index;
   determining, by the user equipment based on the signal-to-interference-plus-noise ratio values, a first group of link quality metric values;
   choosing, by the user equipment, a chosen subband-based index from the group of indices of subband information based on the first group of link quality metric values;
   determining, by the user equipment, a second group of link quality metric values based on the indices of wideband information and the chosen subband-based index; and
   selecting, by the user equipment, a precoding matrix indicator based on the second group of link quality metric values.

2. The method of claim 1, wherein the selecting the precoding matrix indicator comprises searching a codebook based on a selected wideband index and the chosen subband-based index.

3. The method of claim 1, further comprising estimating, by the user equipment, a channel, wherein the determining the signal-to-interference-plus-noise ratio values comprises determining the signal-to-interference-plus-noise ratio values based on the channel.

4. The method of claim 1, further comprising reporting, by the user equipment, parameter values corresponding to the precoding matrix indicator to a network device.

5. The method of claim 1, wherein the determining the first group of link quality metric values based on the signal-to-interference-plus-noise ratio values comprises determining mutual information values for the starting wideband-based index and the group of indices of subband information corresponding to the initial wideband-based index based on the signal-to-interference-plus-noise ratio values.

6. The method of claim 5, wherein the choosing the chosen subband-based index from the group of indices of subband information based on the first group of link quality metric values comprises selecting the subband-based index, which in conjunction with the starting wideband-based index, maximizes mutual information values based on the signal-to-interference-plus-noise ratio values.

7. The method of claim 1, wherein the determining the first group of link quality metric values based on the signal-to-interference-plus-noise ratio values comprises determining capacity data for the starting wideband-based index and the group of indices of subband information corresponding to the starting wideband-based index based on the signal-to-interference-plus-noise ratio values.

8. The method of claim 7, wherein the choosing the chosen subband-based index from the group of indices of subband information based on the first group of link quality metric values comprises selecting as the chosen subband-based index, the subband-based index that in conjunction with the subband-based index wideband-based index, maximizes capacity data.

9. The method of claim 1, wherein the determining the second group of link quality metric values based on the signal-to-interference-plus-noise ratio values comprises determining mutual information values for the indices of wideband information and the chosen subband-based index of subband information based on the signal-to-interference-plus-noise ratio values.

10. The method of claim 9, wherein the selecting the precoding matrix indicator based on the second group of link quality metric values comprises selecting the precoding matrix indicator based on which index of wideband information of the indices of wideband information, in conjunction with the chosen subband-based index, maximizes the mutual information values.

11. The method of claim 1, wherein the determining the second group of link quality metric values based on the signal-to-interference-plus-noise ratio values comprises determining capacity data for the indices of wideband information and the chosen subband-based index of subband information based on the signal-to-interference-plus-noise ratio values.

12. The method of claim 11, wherein the selecting the precoding matrix indicator based on the second group of link quality metric values comprises selecting the precoding matrix indicator based on which index of wideband information of the indices of wideband information, in conjunction with the chosen subband-based index, maximizes the capacity data.

13. A user equipment device, comprising:
a processor; and
a memory that stores executable instructions that, when executed by the processor, facilitate performance of operations, the operations comprising:
choosing a starting wideband-based index from indices of wideband information;
determining signal-to-interference-plus-noise ratio values for the starting wideband-based index and a group of indices of subband information corresponding to the initial wideband-based index;
determining, from the signal-to-interference-plus-noise ratio values, a first group of link quality metric values;
choosing a subband-based index from the group of indices of subband information based on the first group of link quality metric values, the choosing resulting in a chosen subband-based index;

determining a second group of link quality metric values based on the indices of wideband information and the chosen subband-based index; and
reporting parameters corresponding to a precoding matrix indicator based on the second group of link quality metric values to a network device.

14. The user equipment device of claim 13, wherein the first group of link quality metric values comprise first mutual information values, and wherein the second group of link quality metric values comprise second mutual information values.

15. The user equipment device of claim 13, wherein the first group of link quality metric values comprise first capacity data and wherein the second group of link quality metric values comprise second capacity data.

16. The user equipment device of claim 13, wherein the first group of link quality metric values comprise first mutual information values, wherein the second group of link quality metric values comprise second mutual information values, wherein the choosing the chosen subband-based index from the group of indices of subband information based on the first group of link quality metric values comprises determining which index of the group of indices of subband information maximizes the first mutual information values, and wherein the reporting the parameters corresponding to the precoding matrix indicator based on the second group of link quality metric values to a network device comprises choosing the precoding matrix indicator by determining which index of the indices of wideband information, in conjunction with the chosen subband-based index, maximizes the first mutual information values.

17. The user equipment device of claim 13, wherein the first group of link quality metric values comprises first capacity data, wherein the second group of link quality metric values comprises second capacity data, wherein the choosing the chosen subband-based index from the group of indices of subband information based on the first group of link quality metric values comprises determining which index of the group of indices of subband information maximizes the first capacity data, and wherein the reporting the parameters corresponding to the precoding matrix indicator based on the second group of link quality metric values comprises choosing the precoding matrix indicator by determining which index of the indices of wideband information, in conjunction with the chosen subband-based index, maximizes the first capacity data.

18. A machine-readable storage medium, comprising executable instructions that, when executed by a processor of a radio user equipment, facilitate performance of operations, the operations comprising:
selecting a starting wideband-based index from indices of wideband information;
determining signal-to-interference-plus-noise ratio values for the starting wideband-based index and a group of indices of subband information corresponding to the starting wideband-based index;
determining, from the signal-to-interference-plus-noise ratio values, a first group of link quality metric values;
choosing a subband-based index from the group of indices of subband information based on which subband-based index from the group of indices of subband indices in conjunction with the initial wideband-based index maximizes the first group of link quality metric values, the choosing the subband-based index resulting in a chosen subband-based index;

determining a second group of link quality metric values based on the indices of wideband information and the chosen subband-based index;

selecting a wideband index from the indices of wideband information based on which index from the from the indices of wideband information in conjunction with the selected subband-based index satisfies a defined performance criterion for the second group of link quality metric values, the selecting the wideband index resulting in a selected wideband index; and selecting a precoding matrix indicator based on the selected wideband index and the chosen subband-based index.

19. The machine-readable storage medium of claim 18, wherein the first group of link quality metric values comprises mutual information values, and wherein the choosing the chosen subband-based index comprises determining which subband-based index from the group of indices of subband indices in conjunction with the starting wideband-based index maximizes the mutual information values.

20. The machine-readable storage medium of claim 18, wherein the first group of link quality metric values comprises capacity data, and wherein the choosing the chosen subband-based index comprises determining which subband-based index from the group of indices of subband indices in conjunction with the starting wideband-based index maximizes the capacity data.

\* \* \* \* \*